J. Bayliss' Tuyere

2811

Reissued

Dec 17 1867

Witnesses

J. W. M. Cooper

E. B. Tuckers

Inventor

John Bayliss by M. M. Stimpson

Attorney

United States Patent Office.

JOHN BAYLISS, OF NEW YORK, N. Y.

*Letters Patent No.* 56,879, *dated August* 7, 1866; *reissue No.* 2,811, *dated December* 17, 1867.

IMPROVED TUYERE.

The Schedule referred to in these Letters Patent and making part of the same.

TO ALL WHOM IT MAY CONCERN:

Be it known that I, JOHN BAYLISS, of the city, county, and State of New York, have invented a new and useful Improvement in Tuyeres for Blast-Furnaces; and I do hereby declare that the following is a full, clear, and exact description thereof, which will enable others skilled in the art to make and use the same, reference being had to the accompanying drawings, forming part of this specification.

The present invention consists in passing the air-blast, in its passage to the tuyere, through an air-chamber, in such a manner that it will become heated before escaping from the tuyere to the fire of the furnace, whereby a much better consumption of the products of combustion is secured, and thereby a greater amount of heat generated than by the ordinary arrangement of air-blasts for such furnaces. In the accompanying plate of drawings my improvement is illustrated—

Figure 1:
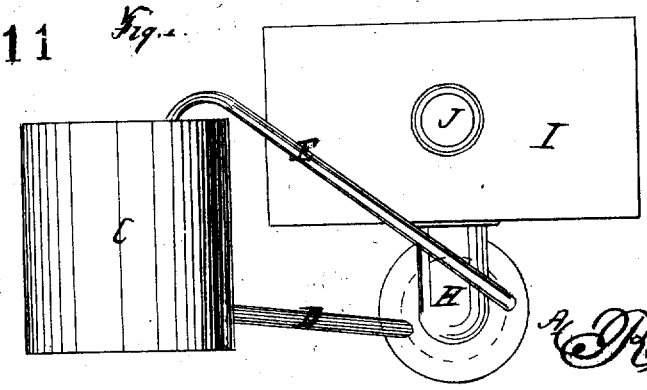

Figure 1 being a view of the tuyere, showing a water-reservoir in connection therewith, as well as my improved construction and arrangement of an air-chamber for heating the blast before escaping from the tuyere.

Figure 2:
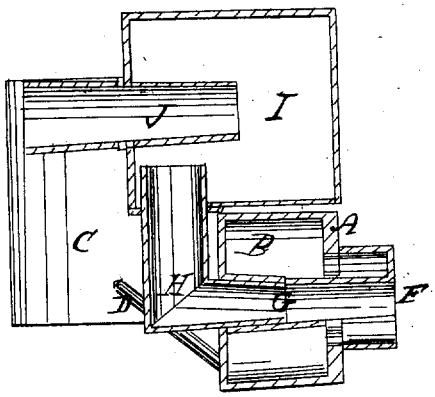
Figure 3:
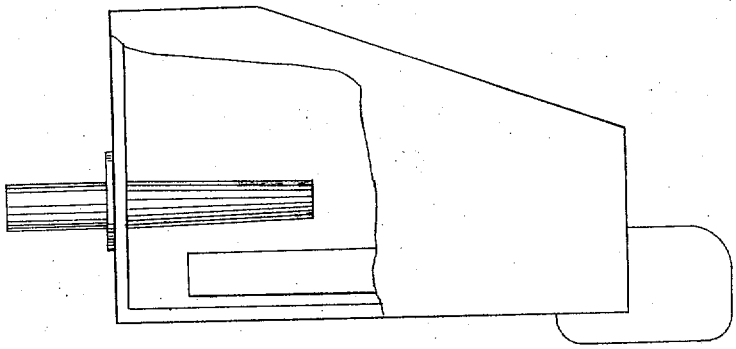

Figure 2, a central vertical section through the tuyere and air-chamber, with the connecting-pipe between the two for the air-blast; and Figure 3 a view in red lines, showing a modified arrangement of parts, but having the same principle of operation and effect.

Similar letters of reference indicate like parts.

A, in the drawings, represents the tuyere, which may be made of any of the ordinary forms of construction therefor, but which, in the present instance, has its rear portion B made hollow, to allow a circulation of water or other cooling medium through the same from a reservoir, C, suitably connected therewith, through pipes D and E; the one, D, for the passage of the water, and the other, E, for the escape of the steam generated by the heat of the tuyere from the water. The tuyere is placed in a horizontal position, with its mouth or orifice F just above the fire-grate of the furnace; the rear end of the orifice G, through the centre of the tuyere, being connected by an elbow-pipe or tube, H, with the under side of an air-chamber or box, I, placed over the tuyere, to the rear side of which, at or near its top, one end of a pipe, J, is connected, that, at its other end, is secured to the apparatus used for producing the air-blast.

From the above description, it is plain to be seen that the air-blast, in passing to the tuyere through the air-chamber or box I, must necessarily become heated thereby, and from the heat of the furnace itself, independent of the tuyere, whereby the consumption of the products of combustion of the furnace is greatly increased, and a consequent greater amount of heat generated than by the ordinary mode of passing the air-blast directly through the tuyere; the importance of which result is apparent to all conversant with the use and operation of blast-furnaces, forges, &c.

In fig. 3 the air-chamber is made of a different form, whereby the supply-pipe thereto and outlet therefrom are made to occupy relatively different positions from that shown in figs. 1 and 2, and enabling a straight pipe to the tuyere to be used in lieu of an elbow-pipe, as therein shown.

I claim as new, and desire to secure by Letters Patent—

A tuyere, A, having a water-chamber, B, provided with connecting water and steam-pipes D and E, in combination with the air-pipe G, air-chamber I, and air-pipe J, arranged together, and operating substantially as and for the purpose represented and described.

The above specification of my invention signed by me, this seventh day of August, 1867.

JOHN BAYLISS.

Witnesses:

M. M. LIVINGSTON,

T. B. BEECHER.